US008624161B2

(12) United States Patent
Hutchison et al.

(10) Patent No.: US 8,624,161 B2
(45) Date of Patent: *Jan. 7, 2014

(54) WELDING PROCESS EMPLOYING VARIABLE MINIMUM CURRENT

(75) Inventors: Richard Martin Hutchison, Iola, WI (US); James Lee Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/640,449

(22) Filed: Dec. 17, 2009

(65) Prior Publication Data

US 2010/0224607 A1  Sep. 9, 2010

Related U.S. Application Data

(60) Provisional application No. 61/157,007, filed on Mar. 3, 2009.

(51) Int. Cl.
*B23K 9/10* (2006.01)

(52) U.S. Cl.
USPC .................. 219/130.21; 219/130.33

(58) Field of Classification Search
USPC ......................... 219/130.21, 130.33
See application file for complete search history.

(56) References Cited

U.S. PATENT DOCUMENTS

| | | | | |
|---|---|---|---|---|
| 5,149,940 | A * | 9/1992 | Davis et al. | 219/130.21 |
| 5,866,873 | A * | 2/1999 | Wang et al. | 219/130.51 |
| 6,015,964 | A * | 1/2000 | Baker | 219/130.33 |
| 6,023,046 | A | 2/2000 | Holverson et al. | |
| 6,617,549 | B2 | 9/2003 | Ihde | |
| 2008/0078812 | A1 | 4/2008 | Peters et al. | |
| 2010/0126976 | A1 | 5/2010 | Kawamoto et al. | |

FOREIGN PATENT DOCUMENTS

EP      1992440 A1   11/2008
WO   2008036433 A2    3/2008

OTHER PUBLICATIONS

PCT/US10/22336 Search Report and Written Opinion Jul. 12, 2010.

* cited by examiner

*Primary Examiner* — Huan Hoang
(74) *Attorney, Agent, or Firm* — Fletcher Yoder P.C.

(57) ABSTRACT

A constant voltage (CV) welding process power supply including a controller that implements a variable minimum current is provided. The controller is configured to periodically compute a running current value during a welding operation. The controller is also configured to periodically compute a minimum current value based on a difference between the running current value and a preset offset value, wherein the preset offset value remains constant throughout the welding operation.

18 Claims, 6 Drawing Sheets

US 8,624,161 B2

WELDING PROCESS EMPLOYING VARIABLE MINIMUM CURRENT

CROSS REFERENCE TO RELATED APPLICATIONS

This application is a Non-Provisional patent application of U.S. Provisional Patent Application No. 61/157,007, entitled "Method and Apparatus for MIG Welding", filed Mar. 3, 2009, which is herein incorporated by reference.

BACKGROUND

The invention relates generally to welding power supplies, and, more particularly, to constant voltage welding process power supplies.

Welding is a process that has become increasingly ubiquitous in various industries and applications. While such processes may be automated in certain contexts, a large number of applications continue to exist for manual welding operations, which often rely on the use of control loops to regulate the welding process. For instance, many constant voltage (CV) welding processes rely on standard CV control loops to regulate processes that use self shielded flux cored wires. A typical CV controller modifies the current output of the power supply to generate a relatively constant voltage output. Accordingly, in high voltage instances (e.g., high voltage when coming out of a short circuit), traditional CV controllers ramp down the current to accommodate the high voltage. However, in high voltage instances, such controllers may decrease the current to current levels that disadvantageously have the effect of extinguishing the welding arc. Accordingly, there exists a need for improved CV control loops that maintain a constant voltage level without extinguishing the welding arc.

BRIEF DESCRIPTION

In one exemplary embodiment, a constant voltage (CV) welding process power supply includes a controller. The controller is configured to compute a varying minimum current level during a welding process, decrease a welding current based upon a computed voltage error, and generate a current command signal to minimize the computed voltage error. The controller is further configured to compare the current command signal to the computed varying minimum current level and apply either the current command signal or the computed varying minimum current level for control of welding output based upon the comparison.

In a second embodiment, a CV welding process power supply includes a current sensor configured to sense current of welding power supplied by the power supply to a welding process and a voltage sensor configured to sense voltage of the welding power. The power supply also includes a control circuit that receives signals indicative of the sensed current and voltage, and is configured to periodically compute a voltage error and a current command signal based on the voltage error, and if the current command signal is not less than a periodically computed minimum current level, then apply a current level indicated by the current command signal for control of welding output, and if the current command signal is less than the periodically computed minimum current level, then apply the periodically computed minimum current level for control of welding output.

In a third embodiment, a CV welding process power supply includes a controller configured to periodically compute a running current value during a welding process. The controller is also configured to periodically compute a minimum current value based on the running current value and an offset value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, various embodiments of a constant voltage (CV) welding process power supply configured to detect and clear short circuit events are provided. The CV welding power supply is capable of automatically adjusting the CV current waveform in sub-millisecond time frames based on received feedback, efficiently detecting short circuit events, responding to short circuit events in a stepped manner, and adjusting the weld voltage setpoint. The CV power supply is also capable of responding to a detected short circuit event by increasing the welding current based upon a periodically computed voltage error and a gain. The power supply may be further configured to increase the welding current based upon increasingly more aggressive gains if the short circuit event does not clear. Additionally, the power supply may allow a predetermined time delay to elapse during which voltage feedback is ignored. The foregoing features may have the effect of avoiding excessive splatter levels, preventing arc outages and wire stubbing, and improving the ability of the system to respond to short circuit events, among other benefits.

Figure 1:
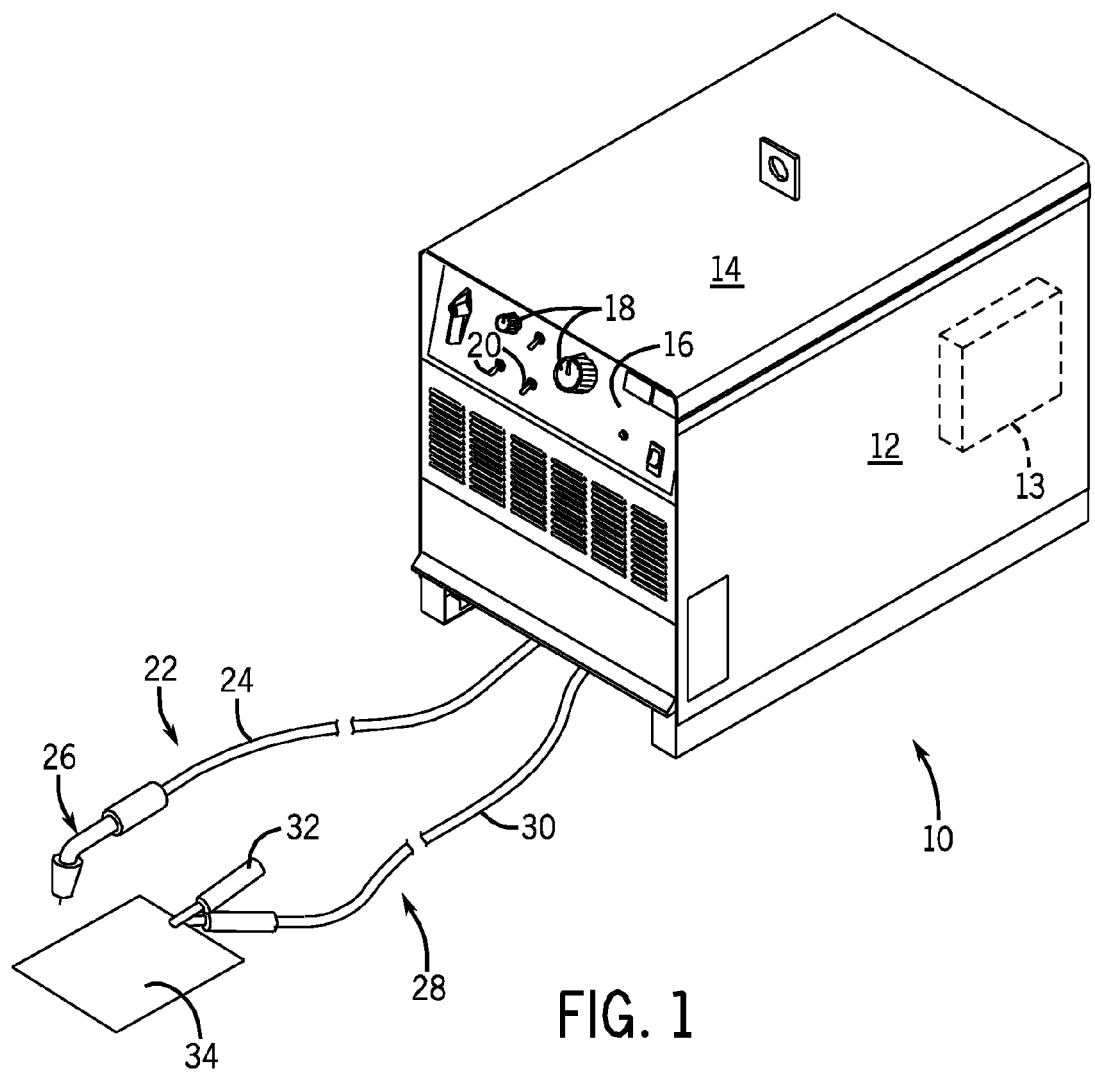
FIG. 1 is a perspective view of an exemplary welding power supply including a controller in accordance with aspects of the present invention.

Turning now to the drawings, FIG. 1 is a perspective view of an exemplary welding system 10, which functions to power, control and provide consumables to a welding operation and auxiliary equipment. The welding system 10 includes a power supply 12 and a wire feeder 13 based in a cabinet or enclosure 14. In some embodiments, the welding system may be configured to permit the power supply to be moved from place to place relatively easily, or may be designed as a generally stationary system. Moreover, the system may be designed for field operation, in which case it may include an engine and generator within the enclosure 14 that provide the necessary power, conditioned appropriately for the given welding operation. In some embodiments, the power supply unit 12 may be communicatively coupled to additional system components, such as a wall power outlet, a battery, engine-driven power sources, and so forth.

The power supply 12 includes a control panel 16, through which a user may control the supply of materials, such as power, gas flow, and so forth, to a welding operation, via dials 18, switches 20, and so forth. As the user adjusts welding parameters via the control panel 16, signals are generated and received by a controller within the welding power supply 12. The power supply 12 controller implements the desired welding operation in accordance with its inputs. For instance, in one embodiment, the controller may implement a constant voltage regime and a wire feed suitable for use with a MIG welding operation.

An electrode assembly 22 extends from the power supply 12 to the location of the weld. A first cable 24 and a welding electrode 26 couple to the power supply unit 12 as components of the electrode assembly 22. The electrode 26 may be any electrode suitable for a variety of welding processes. For instance, the electrode 26 may be a torch suitable for metal inert gas (MIG) operations, a stinger suitable for stick welding operations, and so forth. A work assembly 28 extending from the power supply 12 to the weld includes a second cable 30 terminating in a work lead clamp 32. During operation, the work lead clamp 32 typically connects to a workpiece 34 to close the circuit between the electrode 26, the workpiece 34, and the power supply 12, thus ensuring proper current flow. That is, as the welding operator contacts or closely approaches the tip of the electrode 26 to the workpiece 34, an electrical circuit is completed through the cables 24 and 30, the electrode 26, the workpiece 34, and the clamp 32 to generate an arc between the electrode tip and the workpiece 34.

Figure 2:
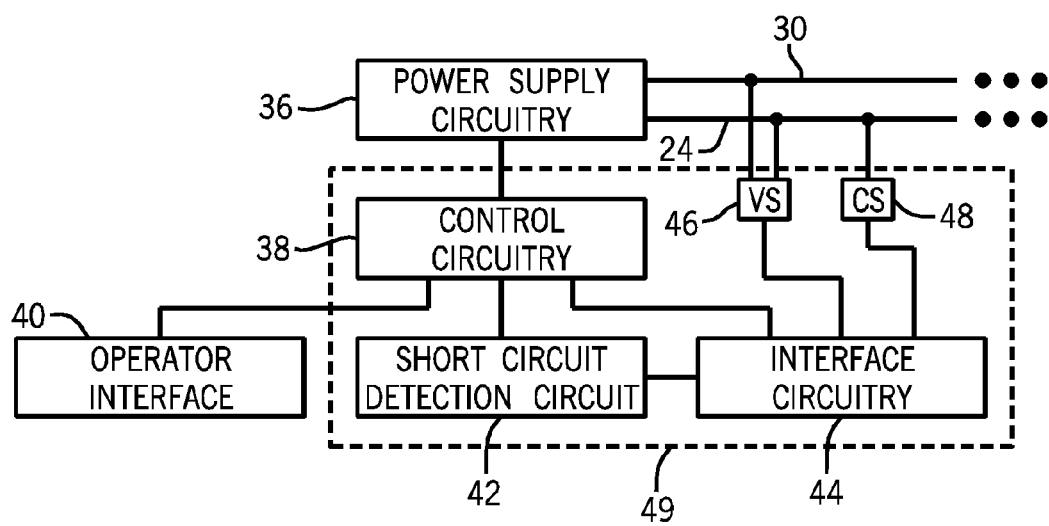
FIG. 2 is a block diagram illustrating exemplary circuitry associated with the power supply of FIG. 1 in accordance with aspects of the present invention.

FIG. 2 is a block diagram illustrating circuitry associated with the power supply of FIG. 1. The power supply includes power supply circuitry 36, control circuitry 38, an operator interface 40, a short circuit detection circuit 42, and interface circuitry 44. A voltage sensor 46 and a current sensor 48 are coupled to the power supply cable 24 that extends to the weld location. The voltage sensor 46 is coupled to the power output via cables 24 and 30 and is configured to sense the voltage level of the welding power. Likewise, the current sensor 48 also interfaces with cable 24 to sense the current level of the welding power. The voltage sensor 46 and the current sensor 48 are communicatively coupled to the short circuit detection circuit 42 via the interface circuit 44. The interface circuit 44 is coupled to the short circuit detection circuit 42 and the control circuitry 38. The control circuitry 38, the short circuit detection circuit 42, and the interface circuitry 44 are components of the system controller 49.

During operation, the power supply circuitry 36 conditions incoming primary power to generate a power output suitable for the welding operation. The voltage sensor 46 and the current sensor 48 detect the voltage and current levels, respectively, of the power output. The sensors 46 and 48 communicate the sensed information to the short circuit detection circuit 42 via the interface circuitry 44. The interface circuitry 44 receives and processes the sensed data and transmits such information to the short circuit detection circuit 42. The short circuit detection circuit 42 is configured to detect a short circuit in the welding power. For example, in one embodiment, the short circuit detection circuit 42 may detect a short circuit by comparing the voltage feedback to a preset voltage level. If the voltage feedback drops below the preset level, the detection circuitry 42 may determine that a short circuit in the welding power has occurred. That is, the short circuit detection circuit 42 is communicatively coupled to the voltage sensor 46 and is configured to receive and process voltage feedback to determine a short circuit in the welding power. Other techniques could be used to detect short circuits as well, such as by reference to current, power, or resistance, or by detecting rates of change of voltage, current, power, or current with respect to voltage and vice versa.

The control circuitry 38 is configured to receive a signal from the detection circuitry 42 indicating a short circuit and output a control signal based on this input. For example, the control circuit 38 may be configured to direct the power supply circuitry 36 to increase the current of the welding power in two or more progressively aggressive short circuit clearing stages. That is, based on a voltage error (e.g., a difference between a detected voltage and a preset voltage) and a gain, the control circuit 38 may direct an increase in the current of the welding power to attempt to clear the short circuit. If the short does not clear after a first clearing stage, the control circuit 38 may again direct an increase in the current of the welding power in one or more additional progressively aggressive short circuit clearing stages. Such functionalities of the control circuit 38 are described in more detail below with respect to FIGS. 3 and 4.

The control circuitry 38 may also be configured to receive and process signals from the operator interface 40. For instance, the operator interface may receive inputs from the user regarding desired weld operating parameters (e.g., desired current level or welding process). The control circuitry 38 is configured to process such inputs concurrently with the inputs received from the detection circuitry 42 and the interface circuitry 44. That is, the control circuitry 38 may receive feedback regarding the voltage and current levels of the power output from the interface circuitry 44. To this end, the control circuitry 38 functions as an intermediate between various input and feedback sources (e.g., sensors and manual input) and the power supply circuitry 36. The control circuitry 38 then continuously outputs one or more control signals to the power supply circuitry 36, thus guiding the proper operation of the welding process.

Figure 3:
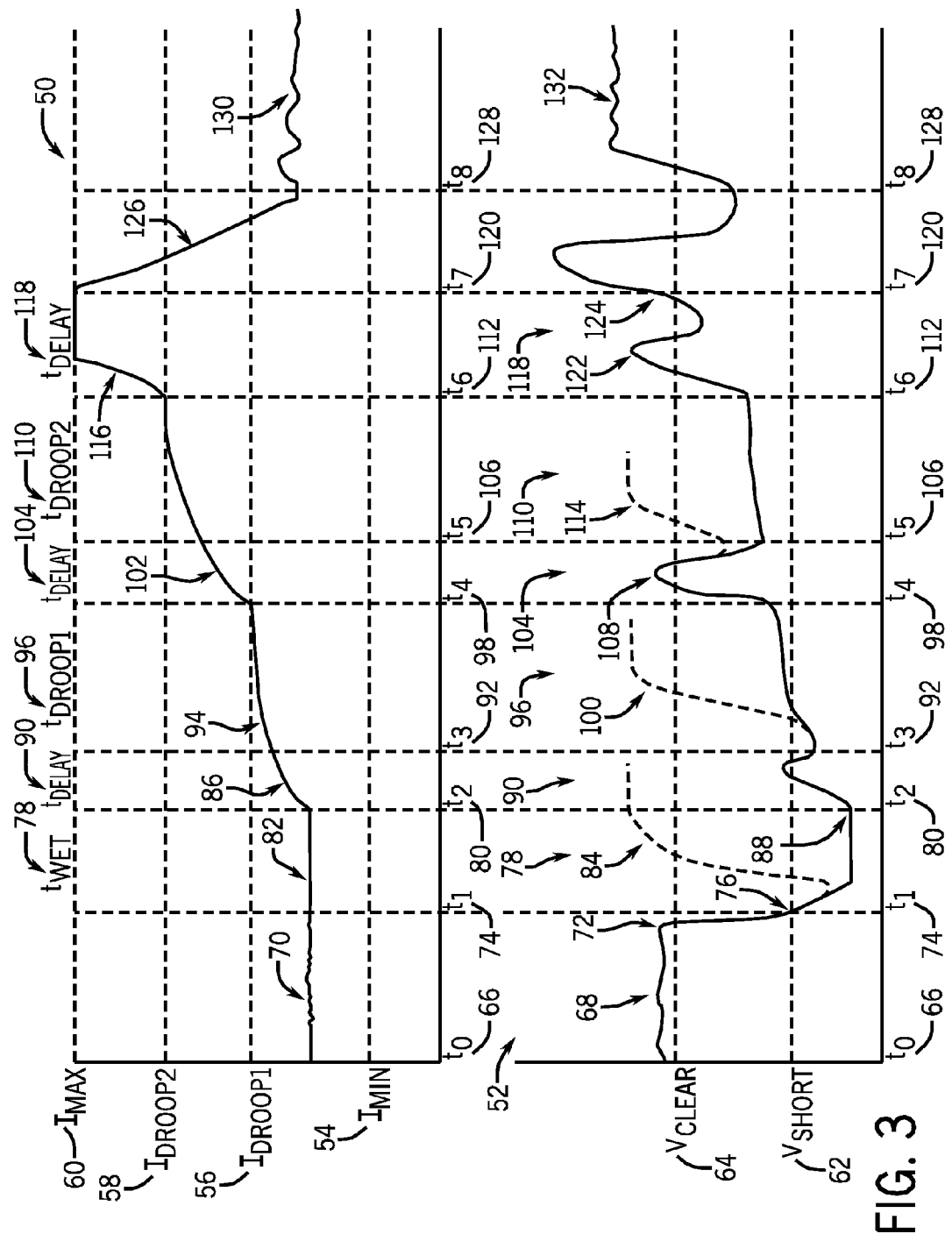
FIG. 3 is a diagram of exemplary current and voltage waveforms over time, illustrating an embodiment of a method that may be employed by a controller to clear a short circuit in the welding power.

FIG. 3 is a diagram of exemplary current and voltage waveforms over time, illustrating a method that may be employed by the control circuitry of FIG. 2 to clear a short circuit in the welding power during a welding operation. The diagram includes a current waveform 50 and a voltage waveform 52. The current waveform 50 is a plot of current versus time. The current waveform 50 includes a minimum current level 54, which represents the minimum amount of current that the CV portion of the control system can regulate. This minimum current level 54 is constantly being adjusted during the weld and is derived from the average current that is being run as described in more detail below. The current waveform 50 also includes a first current level 56 and a second current level 58 that represent the maximum current available at the first setting and the second setting, respectively. A maximum current level 60 represents the maximum current available from the power source. The voltage waveform 52 is a plot of voltage versus time. The voltage waveform 52 includes a short circuit voltage level 62 and a clear voltage level 64. The initiation of a short circuit in the welding power occurs when the voltage drops below the short circuit voltage level 62. The clearing of a short circuit occurs when the voltage exceeds the clear voltage level 64.

In the illustrated FIG. 3, a welding operation begins at a first time 66. A welding voltage 68 and a welding current 70 are established during the welding process. During operation, at point 72 on the voltage waveform 52, the welding voltage begins to drop off from the welding voltage level 68. At a second time 74, the voltage level crosses the short circuit voltage level 62, and, thus, a short circuit event occurs at point 76. A time period 78 labeled $T_{wet}$ then elapses from time 74 to a time 80. During time period 78, the controller maintains the welding current at the welding level as in the portion of the waveform 50 indicated by arrow 82 to allow the short circuit event time to naturally clear. That is, since many short circuit events, such as those associated with self shielded electrode wires, naturally clear in a short period of time, the controller initially remains inactive for the duration of time period 78. Curve 84 represents the voltage waveform path that may occur if the short circuit event clears during time period 78. If curve 84 is followed, the voltage level exceeds the voltage clear level 64, and the controller reverts to a normal operating mode; the short circuit event is over.

If the short circuit does not naturally clear during time period 78, at time point 80, the controller increases the welding current (curve 86) based on a periodically computed voltage error and a first gain in an attempt to clear the short circuit. That is, based on the first gain and the difference between the actual voltage level at point 88 and the preset voltage level 64, the controller determines an appropriate increase in welding current. After initiating the increase in voltage at time point 80, the controller operates without regard to voltage feedback during a delay time period 90 from time point 80 to a time point 92. The foregoing feature may be advantageous because the change in current with respect to time during time period 90 induces a voltage across the output of the power source that is proportional to the magnitude of the inductance of the work and electrode assemblies. This induced voltage may create a transient voltage spike above the clear voltage level 64, thereby rendering voltage feedback during the delay time period 90 unreliable as an indicator of a short circuit clearing. Accordingly, the controller operates without regard for voltage feedback during time period 90.

At time point 92, the controller begins to monitor voltage feedback as the current is further increased (curve 94). During a first time period 96 from time point 92 to time point 98, the voltage level may exceed the voltage clear level 64, thus clearing the short circuit event. If such a clearing occurs, the voltage waveform 52 follows curve 100, and the controller reverts to a normal operating mode. If the time period 96 elapses and the voltage feedback remains below the clear voltage level 64, at time point 98, the controller initiates a second increase in welding current based upon the periodically computed voltage error and a second gain higher than the first gain (curve 102). That is, at time point 98, the controller initiates a second short circuit clearing stage that is more aggressive than the first clearing stage. A second delay period 104 elapses from time point 98 to time point 106, during which the controller again operates without regard to voltage feedback. That is, although curve 108 exceeds the clear voltage threshold 64, the controller does not impede the current increase. After time point 106, the controller again monitors voltage feedback during a second time period 110 that lasts until time point 112. During the second period 110, the voltage may exceed the clear voltage level 64, as indicated by curve 114. If the waveform follows curve 114, the short circuit event is cleared, and the controller returns to normal operation. In the illustrated voltage and current waveforms 50 and 52, two periods 96 and 110 are shown. However, in alternate embodiments, more than two progressively aggressive periods may be initiated by the controller to clear the short circuit event.

In the illustrated embodiment, after the welding current is increased based on the second gain, at time point 112, the controller increases the welding current to the maximum current level 60 to attempt to clear the short circuit (curve 116). A third delay period 118 elapses from time point 112 to time point 120, during which the controller operates with a disregard for voltage feedback. Again, when curve 122 exceeds the clear voltage level 64, this is ignored by the controller until time point 120. At time point 120, the controller receives voltage feedback indicating that the voltage level has exceeded the clear threshold 64 at point 124. The controller then decreases the welding current, as indicated by curve 126. At time point 128, the controller returns to a normal CV control loop, and the current level stabilizes (curve 130), the voltage level stabilizes (curve 132), and normal welding operation resumes. That is, the short circuit event has been cleared, so the controller returns to normal operation.

Figure 4:
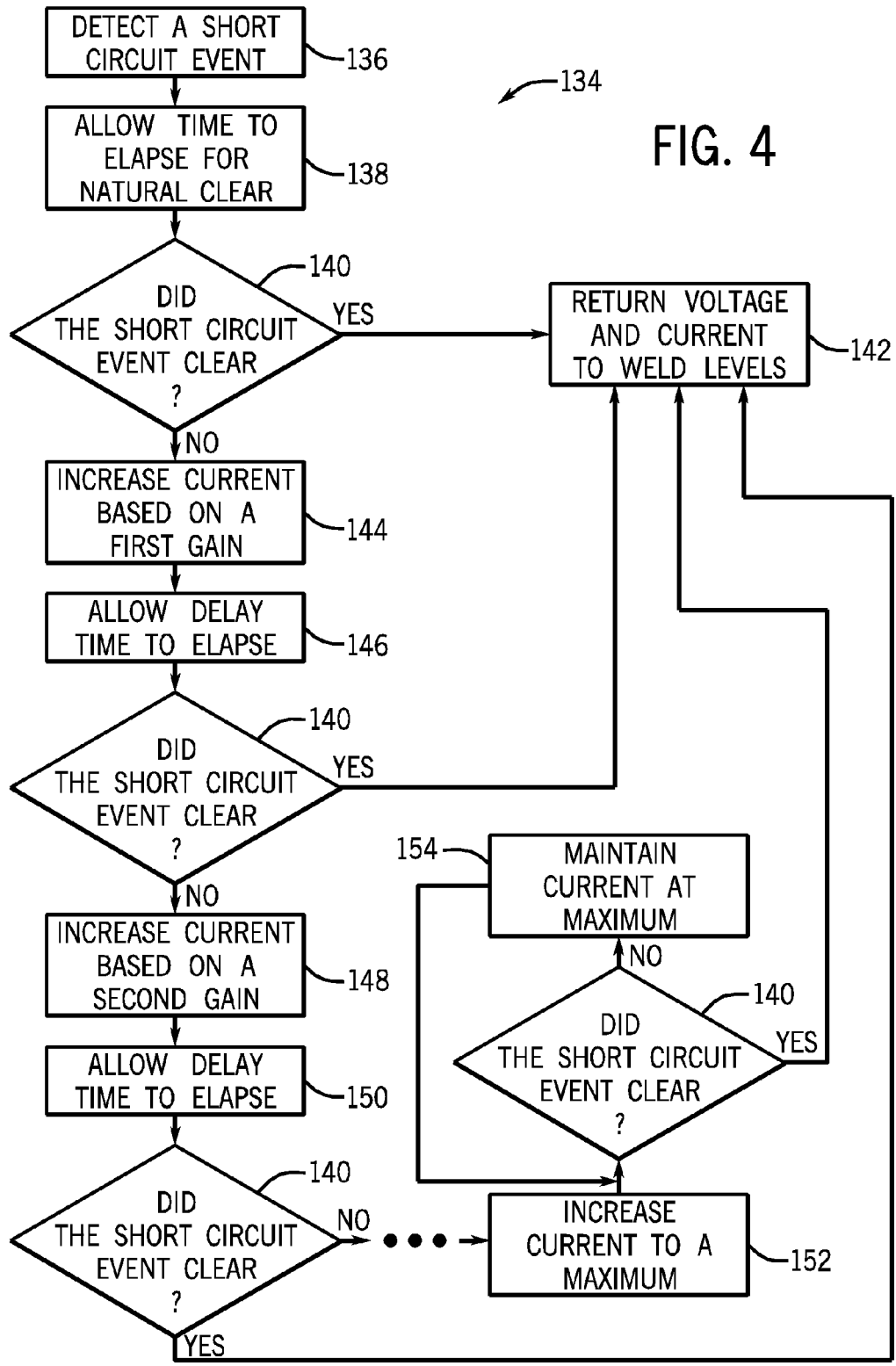
FIG. 4 is an exemplary short circuit clearing flow chart including steps that a controller may implement to clear a short circuit in the welding power in accordance with aspects of the present invention.

FIG. 4 is a short circuit clearing flow chart 134 including steps that the controller may implement to clear a short circuit in the welding power. First, the controller detects a short circuit event (block 136). For example, the controller may receive feedback from a voltage sensor indicating that the sensed voltage has dropped below a voltage threshold. Next, the controller allows a preset delay time to elapse, during which the short circuit may naturally clear (block 138). The controller then checks to see if the short circuit event has cleared (block 140). If the short circuit has cleared, the controller directs the power supply circuitry to return the voltage and current levels to normal welding levels (block 142). If the short circuit has not cleared, the controller increases the current based on the first gain and the voltage error (block 144) and allows a delay time to elapse (block 146). That is, the controller operates without regard to voltage feedback during the delay time. Such an action is necessary since the current increase may lead to a temporarily elevated induced voltage, which is not indicative of a short circuit clearing.

After the delay time, the controller again checks if the short circuit event has cleared (block 140), and if the short circuit has cleared, the controller regulates the return of the voltage and current to welding levels (block 142). If the short circuit event has not cleared, the controller increases the current based on the second gain, which is higher than the first gain, and the computed voltage error (block 148). The controller again allows a delay time to elapse (block 150) during which the controller operates without regard for the voltage feedback. The controller again checks if the short circuit event has cleared (block 140), and if the short circuit has cleared, the controller regulates the return of the voltage and current to welding levels (block 142). The controller may repeat such current increases, time delays, and clearing check steps any number of times as suitable for the given welding operation.

Once the controller has exhausted a series of progressively aggressive current increases in an attempt to clear the short circuit, the current is increased to the maximum current the power supply is capable of realizing (block 152). After such an increase and a preset delay time, the controller again checks if the short circuit has cleared (140) and returns the current and voltage to welding levels if the short circuit event has cleared. If the short circuit event still has not cleared, the controller maintains the current at the maximum until clearing (block 154).

It should be noted that the particular algorithm noted above, in which the progressively increasing current for short clearing is based upon voltage errors (i.e., comparison) and gains may be supplemented or complemented in various ways. For example, although a simple error-proportional control may be implemented, more complex current control schemes may be envisioned that may take into account rates of change of voltage, change in error, and so forth. Moreover, the gains may be fixed or changing, and may be set by default, or may be subject to some degree of modification, such as by operator adjustment of a parameter that offers a difference in the feel or responsiveness of the system to short circuit events.

Figure 5:
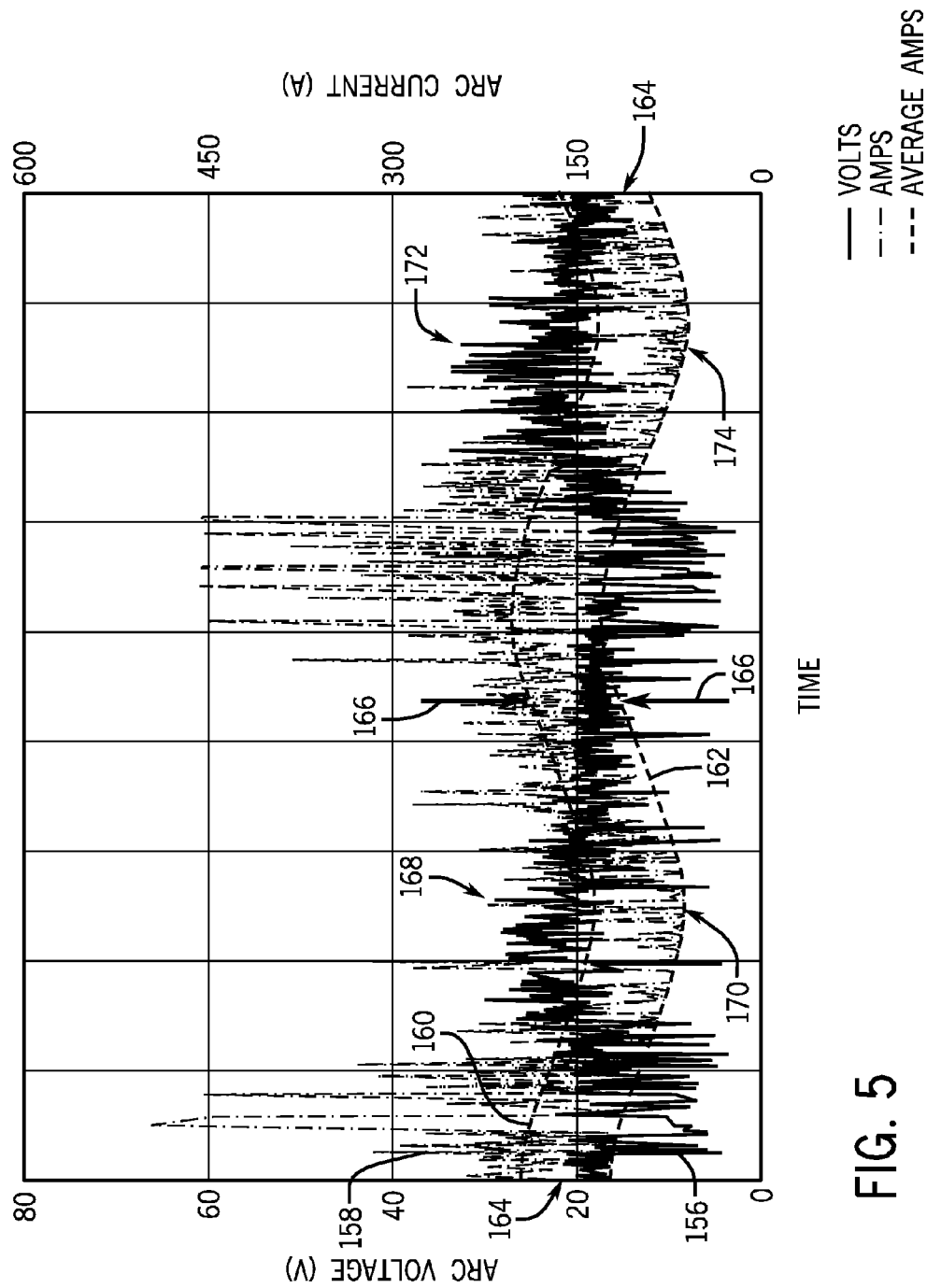
FIG. 5 is a diagram of exemplary current and voltage waveforms over time, illustrating an embodiment of a method that may be employed by a controller to regulate the minimum allowable current value.

FIG. 5 illustrates a plot 156 of voltage vs. time and a plot 158 of current vs. time during an exemplary weld event controlled by the disclosed system controller. A typical constant voltage (CV) controller modifies the current output of the power supply to generate a relatively constant voltage output. Accordingly, in high voltage instances (e.g., high voltage when coming out of a short circuit), traditional CV controllers ramp down the current to accommodate the high voltage. However, in high voltage instances, such controllers may decrease the current to current levels that disadvantageously have the effect of extinguishing the welding arc. The control method implemented by the system controller disclosed herein may offer distinct benefits over such CV controllers. Specifically, the system controller described below utilizes a running average of the current to continuously set and reset a minimum current value, thereby ensuring that the welding arc does not extinguish during high voltage instances.

The voltage vs. time plot 156 and the current vs. time plot 158 illustrate such a feature of the system controller. As illustrated in FIG. 5, a running average current level is indicated by dashed line 160, and a continuously adjusted current minimum is indicated by dashed line 162. A distance 164 between the running average current level 160 and the continuously adjusted minimum level 162 remains constant during the weld event, as indicated by arrows 166. That is, the minimum current level 162 is continuously reset a preset amount (e.g., 70 Amps) below the running average current level 160 throughout the weld event. Accordingly, during operation, the instantaneous current is sampled throughout the weld at predetermined time intervals (e.g., sample once every 100 μs). At each time interval, the acquired measurement is averaged with the previous measurements to generate the instantaneous running average current level at that point. The instantaneous minimum current level at that time point is then set at the preset distance 164 below the instantaneous running average level. In such a way, in the illustrated embodiment, the minimum current level 162 is continuously adjusted throughout the weld event, but the minimum current level 162 always remains at a constant offset 164 from the running average level 160. However, it should be noted that in other embodiments the offset 164 may not remain constant. For instance, in one embodiment, the minimum current level 162 may be further constrained by a current minimum limit. That is, in some embodiments, the continuously updated minimum current 162 may be prohibited from dropping below a preset current limit (e.g., 50 Amps) even if the offset value 164 must change. In operation, as can be seen from the plots, as the voltage changes due to changing welding conditions, a difference between the actual (sensed) voltage and a desired voltage output is considered a voltage error, and the current will be controlled to reduce this voltage error. Conversely, when the voltage rises substantially, however, and the current command would otherwise drop the current level below the minimum allowable current, the command is set to the minimum level. The minimum level continues to change based upon the offset from the running average and any preset current limit.

In practice, various techniques may be used to generate the baseline current that is used to compute the following minimum current level. The presently contemplated approach uses a running average of the actual current. Any suitable technique may be used, however, including weighted averages, values based upon more or fewer samples of actual current, values based on commanded current, and so forth. Moreover, while the presently contemplated technique uses a fixed offset from this reference value of current, other approaches may use an offset that is computed and that may vary over time, or as a function of a welding parameter.

Referring more particular to the plots of FIG. 5, the foregoing features may have distinct advantages over traditional CV control loop systems. For example, during high voltage instances, a traditional CV controller would dictate a large current drop. However, in presently contemplated embodiments, as shown in FIG. 5, current drops in response to high voltage instances are capped by the continuously adjusted minimum current level 162. For example, consider a portion 168 of the voltage curve 156, which represents an increase in the voltage level. A proportional current response needed to return the voltage to the preset level would require a substantial drop in current below the minimum current level 162. However, the controller prevents the current from dropping below the minimum current level, as indicated by portion 170 of the current plot 158. Likewise, consider the high voltage event indicated by portion 172 of the voltage curve 156. A substantial current drop would be dictated by a traditional CV controller in response to portion 172 of the voltage curve 156. However, the presently contemplated controller caps the current response at the continuously adjusted minimum current level 162, as indicated by portion 174 of the current waveform 158. In this way, the present controller may prevent current drops to levels below the continuously adjusted minimum, thus ensuring that the welding arc is not extinguished due to current level adjustments.

Figure 6:
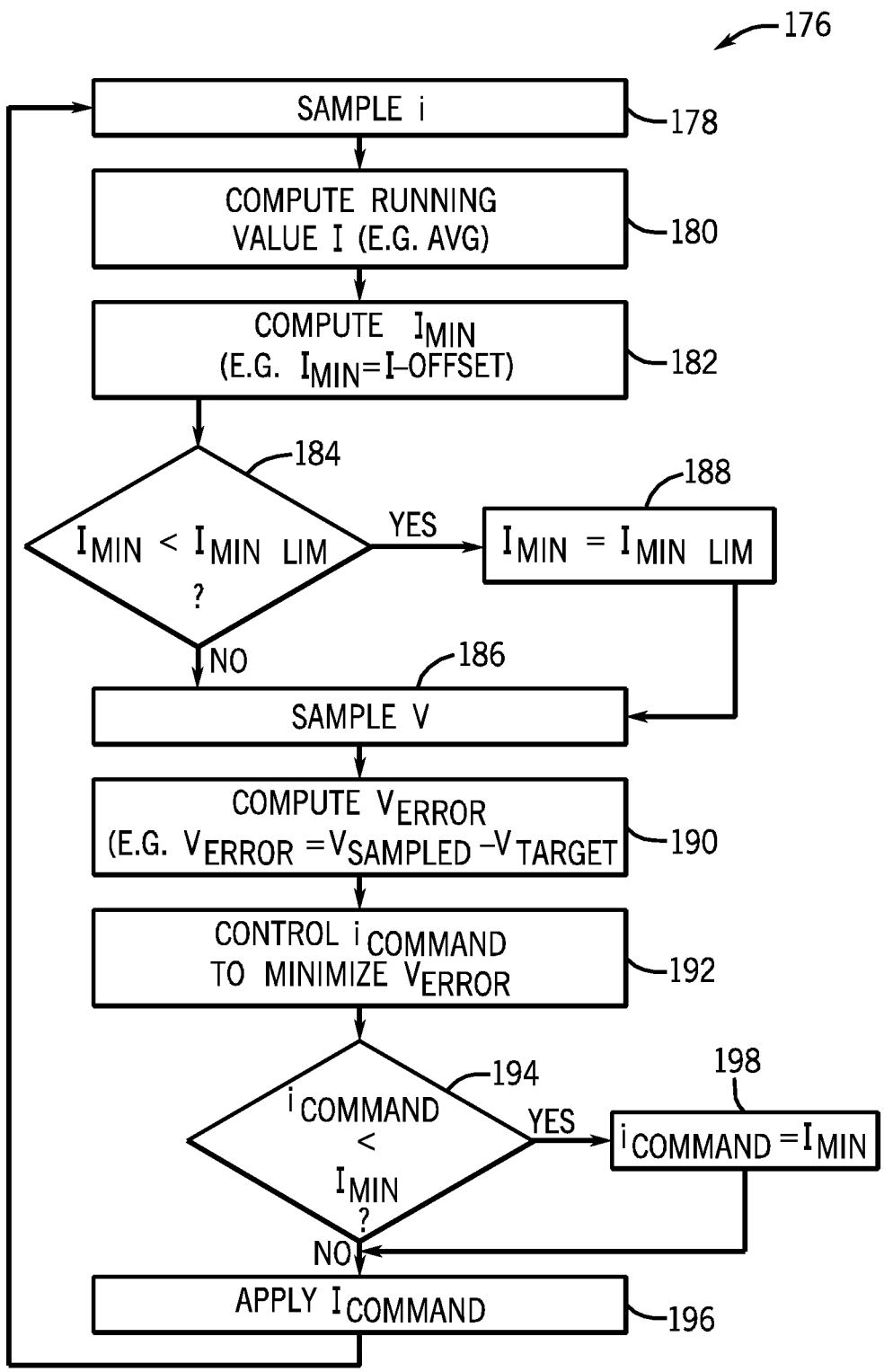
FIG. 6 is a flow chart including steps that a controller may implement to set a minimum current value in accordance with embodiments of the present invention.

FIG. 6 is a flow chart 176 illustrating a method that may be employed by the system controller to regulate the current level in accordance with embodiments of the present invention. The controller first samples the current (i) (block 178). The running value (I) is then computed by the controller (block 180). For example, I may be the running average of the current, as indicated by curve 160 in FIG. 5. The minimum current level ($I_{min}$) is then computed by the controller (block 182). In one embodiment, an instantaneous $I_{min}$ may be determined by subtracting a preset offset distance (e.g., 70 Amps) from I (i.e., $I_{min}$=I−offset). That is, the minimum current level at a given time point may be determined by subtracting the offset distance from the running current value at that time point.

The controller then inquires as to whether $I_{min}$ is less than a preset current minimum limit ($I_{min\ lim}$) (block 184). That is, in some embodiments, $I_{min\ lim}$ may limit how low $I_{min}$ may drop (e.g., lower limit of 50 Amps). If $I_{min}$ is not less than $I_{min\ lim}$, the controller may then sample the voltage (V) (block 186). If $I_{min}$ is less than $I_{min\ lim}$, the controller sets $I_{min}$=$I_{min\ lim}$, (block 188), thus limiting the minimum current level to the preset limit before sampling V (block 186). The controller then computes a voltage error ($V_{error}$), which indicates the difference between the actual voltage and the preset voltage (block 190). That is, $V_{error}$ may equal the sampled voltage ($V_{sample}$) minus the target voltage ($V_{target}$), thus indicating the degree to which the voltage is not remaining at the constant preset value. The controller may then output a current control command ($i_{command}$) that indicates the current level necessary to minimize $V_{error}$ and return the operating voltage to the preset voltage level (block 192). The controller then inquires as to whether $i_{command}$ less than $I_{min}$ (block 194). If $i_{command}$ is not less than $I_{min}$, the controller applies $i_{command}$ (block 196), the current level is dropped to the commanded current level, and the controller again samples the current (block 178). If $i_{command}$ is less than $I_{min}$, then $i_{command}$ is reset to $I_{min}$ (block 198). That is, the controller prohibits the current level from dropping below $I_{min}$ even in instances where such a current level is computationally determined to be necessary to minimize the voltage error. Again, such a feature may have the effect of preventing welding arc outages resulting from high voltage levels driving down the commanded current levels.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A constant voltage (CV) welding process power supply comprising:
 a control circuit that, in operation:
  computes a varying minimum current level during a welding process;
  computes, during the welding process, a voltage error between an instantaneous welding voltage level of the welding process and a desired voltage level;
  generates a current command signal to minimize the computed voltage error;
  compares the current command signal to the computed varying minimum current level; and
  applies either the current command signal or the computed varying minimum current level for control of welding output based upon the comparison.

2. The CV welding process power supply of claim 1, wherein the desired voltage level comprises a short circuit clearance voltage level.

3. The CV welding process power supply of claim 1, wherein the computed varying minimum current level is approximately equal to a computed running current value minus an offset value.

4. The CV welding process power supply of claim 3, wherein the computed running current value is approximately equal to an instantaneous current value averaged with one or more previous current values.

5. The CV welding process power supply of claim 3, wherein the offset value remains constant throughout a welding process.

6. The CV welding process power supply of claim 5, wherein the offset value is equal to approximately 70 Amps.

7. The CV welding process power supply of claim 1, wherein the control circuit, in operation, samples an instantaneous current one or more times and resets the computed varying minimum current level based on the sampled current.

8. A CV welding process power supply comprising:
 a current sensor configured to sense current of welding power supplied by the power supply to a welding process;
 a voltage sensor configured to sense voltage of the welding power; and
 a control circuit that receives signals indicative of the sensed current and voltage, and is configured to periodically compute a voltage error between the sensed voltage of the welding power and a desired voltage level, and to periodically compute a current command signal based on the voltage error, and if the current command signal is not less than a periodically computed minimum current level, then apply a current level indicated by the current command signal for control of welding output, and if the current command signal is less than the periodically computed minimum current level, then apply the periodically computed minimum current level for control of welding output.

9. The CV welding process power supply of claim 8, wherein the desired voltage level comprises a short circuit clearance voltage level.

10. The CV welding process power supply of claim 8, wherein the periodically computed minimum current level is approximately equal to a periodically computed running current value minus an offset value.

11. The CV welding process power supply of claim 10, wherein the periodically computed running current value is approximately equal to an instantaneous current value averaged with one or more previous current values.

12. The CV welding process power supply of claim 10, wherein the offset value remains constant throughout a welding process.

13. The CV welding process power supply of claim 8, wherein the control circuit is further configured to sample an instantaneous current one or more times with the current sensor and reset the periodically computed minimum current level based on the sampled current.

14. The CV welding process power supply of claim 13, wherein the instantaneous current is sampled approximately every 100μs.

15. A constant voltage (CV) welding process power supply comprising:
 a control circuit that, in operation:
  periodically computes a running current value during a welding process;
  periodically computes a minimum current value based on the running current value and an offset value; and
  generates a current command signal to minimize a periodically computed voltage error, wherein if the current command signal is not less than the periodically computed minimum current value, then the power supply applies a current level indicated by the current command signal for control of welding output, and if the current command signal is less than the periodically computed minimum current value, then the power supply applies the periodically computed minimum current level for control of welding output.

16. The CV welding process power supply of claim 15, wherein the periodically computed voltage error is based upon a difference between a desired welding voltage and a sensed voltage.

17. The CV welding process power supply of claim 15, wherein the running current value is a running average of welding output current.

18. The CV welding process power supply of claim 17, wherein the offset value is a fixed value.

* * * * *